(12) United States Patent
Chang et al.

(10) Patent No.: US 8,995,319 B2
(45) Date of Patent: Mar. 31, 2015

(54) TERMINAL OF SUPPORTING DIRECT COMMUNICATION USING INFRA COMMUNICATION AND DIRECT COMMUNICATION METHOD OF THE SAME

(75) Inventors: Sung Cheol Chang, Daejeon (KR); Mi Young Yun, Daejeon (KR); Eunkyung Kim, Daejeon (KR); Sung Kyung Kim, Daejeon (KR); Won-Ik Kim, Daejeon (KR); Hyun Lee, Daejeon (KR); Chul Sik Yoon, Seoul (KR); Kwang Jae Lim, Daejeon (KR); Seokki Kim, Osan-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 84 days.

(21) Appl. No.: 13/547,672

(22) Filed: Jul. 12, 2012

(65) Prior Publication Data
US 2013/0016646 A1    Jan. 17, 2013

(30) Foreign Application Priority Data

| Jul. 12, 2011 | (KR) | 10-2011-0068665 |
| Oct. 20, 2011 | (KR) | 10-2011-0107611 |
| Nov. 1, 2011 | (KR) | 10-2011-0113005 |
| Jul. 12, 2012 | (KR) | 10-2012-0075942 |

(51) Int. Cl.
*H04B 7/00* (2006.01)
*H04W 76/02* (2009.01)
*H04W 88/04* (2009.01)

(52) U.S. Cl.
CPC ............ *H04W 76/023* (2013.01); *H04W 88/04* (2013.01)
USPC ........................................ 370/310

(58) Field of Classification Search
CPC .................................................. H04W 76/023
USPC .................... 370/310, 328, 329, 431
See application file for complete search history.

(56) References Cited

U.S. PATENT DOCUMENTS

| 6,580,704 | B1 * | 6/2003 | Wellig et al. .................. 370/338 |
| 7,920,887 | B2 | 4/2011 | Cho et al. |
| 8,504,052 | B2 * | 8/2013 | Hakola et al. .............. 455/452.1 |
| 8,718,679 | B2 * | 5/2014 | Kim et al. .................. 455/456.3 |
| 2008/0165717 | A1 * | 7/2008 | Chen et al. ..................... 370/312 |
| 2010/0034145 | A1 * | 2/2010 | Kim et al. ..................... 370/328 |

(Continued)

FOREIGN PATENT DOCUMENTS

| KR | 10-2009-0008509 A | 1/2009 |
| KR | 10-2009-0009376 A | 1/2009 |

OTHER PUBLICATIONS

IEEE, Air Interface for Broadband wireless access systems, IEEE P802.16/D5, May 2012, pp. 1-57.*
IEEE, 802.16M, Advanced Air Interface, IEEE, May 6, 2011, pp. 1-1106.*
Sungcheol Chang et al., "Forwarding Operation for Direct Communication", IEEE C802.16n-11/0058, Mar. 13, 2011.

(Continued)

*Primary Examiner* — Dmitry H Levitan
(74) *Attorney, Agent, or Firm* — Rabin & Berdo, P.C.

(57) ABSTRACT

A method in which a first terminal supports direct communication using infracommunication includes setting at least one direct communication link with at least one second terminal, setting at least one traffic connection with a base station, and forwarding data that is transmitted through the at least one direct communication link from the at least one second terminal to the at least one traffic connection or forwarding data that is transmitted through the at least one traffic connection from the base station to the at least one direct communication link.

5 Claims, 12 Drawing Sheets

(56) References Cited

U.S. PATENT DOCUMENTS

| | | | |
|---|---|---|---|
| 2010/0177712 A1* | 7/2010 | Kneckt et al. | 370/329 |
| 2010/0271995 A1* | 10/2010 | Seok et al. | 370/311 |
| 2011/0106952 A1* | 5/2011 | Doppler et al. | 709/226 |
| 2012/0015607 A1* | 1/2012 | Koskela et al. | 455/62 |
| 2012/0120892 A1* | 5/2012 | Freda et al. | 370/329 |
| 2013/0016649 A1* | 1/2013 | Damnjanovic et al. | 370/315 |
| 2013/0021932 A1* | 1/2013 | Damnjanovic et al. | 370/252 |

OTHER PUBLICATIONS

Sungcheol Chang et al., "Text Proposals of HR-MS Forwarding in 16n Network", IEEE S802.16n-11/0074, May 16, 2011.

Sungcheol Chang et al., "Text Proposals of HR-MS Forwarding using Talk-around Direct Communications", IEEE 802.16n-11/0134, Jul. 11, 2011.

Sungcheol Chang et al., "Text Proposals of HR-MS Forwarding in 16n Network", IEEE C802.16n-11/0074, May 9, 2011.

* cited by examiner

TERMINAL OF SUPPORTING DIRECT COMMUNICATION USING INFRA COMMUNICATION AND DIRECT COMMUNICATION METHOD OF THE SAME

CROSS-REFERENCE TO RELATED APPLICATION

This application claims priority to and the benefit of Korean Patent Application Nos. 10-2011-0068665, 10-2011-0107611, 10-2011-0113005, and 10-2012-0075942 filed in the Korean Intellectual Property Office on Jul. 12, 2011, Oct. 20, 2011, Nov. 1, 2011, and Jul. 12, 2012, respectively, the entire contents of which are incorporated herein by reference.

BACKGROUND OF THE INVENTION (a) Field of the Invention

The present invention relates to a terminal that supports direct communication using infracommunication, and a method of performing direct communication of the same.

(b) Description of the Related Art

In an environment in which infrastructure communication is constructed between a terminal and a base station, a method of performing direct communication between terminals using a specific resource area is suggested.

Infracommunication and direct communication between terminals are performed using independent resources and are different communication methods.

When direct communication between terminals is performed, in order to exchange information with a backbone network or to widen a serviceable area, it is necessary to use infracommunication.

SUMMARY OF THE INVENTION

The present invention has been made in an effort to provide a terminal that supports direct communication using infracommunication, and a method of performing direct communication of the same.

An exemplary embodiment of the present invention provides a method in which a first terminal supports direct communication using infracommunication, the method including: setting at least one direct communication link with at least one second terminal; setting at least one traffic connection with a base station; and forwarding data that is transmitted from the at least one second terminal through the at least one direct communication link to the at least one traffic connection or forwarding data that is transmitted from the base station through the at least one traffic connection to the at least one direct communication link.

Another embodiment of the present invention provides a method in which a first terminal supports direct communication using infracommunication, the method including performing a service setting procedure with a base station in order to perform direct communication with at least one second terminal, wherein at the performing of a service setting procedure, a dynamic service addition-request (DSA-REQ) message is transmitted to the base station, and the DSA-REQ message includes identifier information of the first terminal and identifier information of the second terminal.

Yet another embodiment of the present invention provides a method in which a first terminal performs direct communication using infracommunication, the method including: receiving system information including a blind paging cycle and blind paging offset from a base station; receiving an advertisement message for setting a direct communication service from the base station using the blind paging cycle and the blind paging offset; and performing, when an identifier of the first terminal is included in the advertising message, a service setting procedure with the base station.

DETAILED DESCRIPTION OF THE EMBODIMENTS

Figure 1:
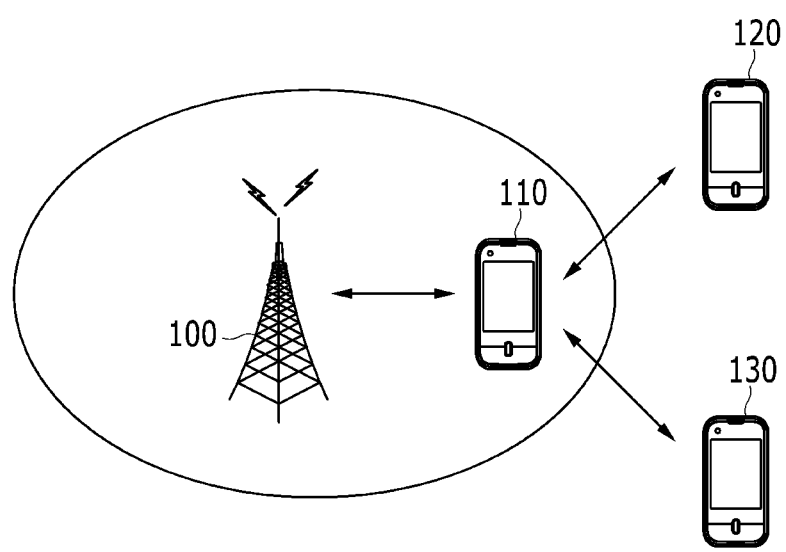
FIG. 1 is a diagram illustrating a communication environment according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

In the entire specification, a mobile station (MS) may indicate a terminal, a mobile terminal (MT), a subscriber station (SS), a portable subscriber station (PSS), an access terminal (AT), and user equipment (UE), and may include an entire function or a partial function of the terminal, the MT, the SS, the PSS, the AT, and the UE.

Further, a base station (BS) may indicate a node B, an evolved node B (eNode B), an access point (AP), a radio access station (RAS), a base transceiver station (BTS), and a mobile multihop relay (MMR)-BS, and may include an entire function or a partial function of the node B, the eNode B, the AP, the RAS, the BTS, and the MMR-BS.

A first exemplary embodiment of the present invention will now be described. The first exemplary embodiment of the present invention relates to a method in which a terminal that participates in direct communication between terminals exchanges information with a communication subject that is positioned at a backbone network using infracommunication.

FIG. 1 is a diagram illustrating a communication environment according to a first exemplary embodiment of the present invention.

Referring to FIG. 1, a communication environment according to an exemplary embodiment of the present invention includes a base station 100 and at least one of terminals 110, 120, and 130. Here, the terminals 110, 120, and 130 perform direct communication between terminals. In this case, the terminal 110 is positioned within an area in which it can perform infracommunication with a base station. That is, the terminal 110 may include both an infracommunication interface and a direct communication interface. The terminal 110 can independently operate direct communication and infracommunication. The terminals 120 and 130 may be positioned at an area in which infracommunication is available or an area in which infracommunication is unavailable.

In this specification, a terminal that is positioned at an area in which infracommunication is available like the terminal 110 and that exchanges data by performing infracommunication with the base station 100 and that exchanges data by performing direct communication with the terminals 120 and 130 is referred to as a forwarding MS. The forwarding MS 110 participates in both direct communication and infracommunication. The forwarding MS 110 mutually forwards two links using an infracommunication interface and a direct communication interface. That is, the forwarding MS 110 may forward data that it receives from the terminals 120 and 130 through direct communication to the base station 100 through infracommunication, and forward data that it receives from the base station 100 through infracommunication to the terminals 120 and 130 through direct communication.

The base station 100 is connected to an upper level layer (including a server) that is positioned at a backbone network, and receives data from the upper level layer or transmits data to the upper level layer. Therefore, even if direct communication between the forwarding MS 110 and the terminals 120 and 130 is performed independently from a backbone network, the terminal 110 and the terminals 120 and 130 exchange data with the upper level layer through the base station 100. For this purpose, the forwarding MS 110 sets a traffic connection to the base station and connects the traffic connection to a direct communication link with the terminals 120 and 130.

Figure 2:
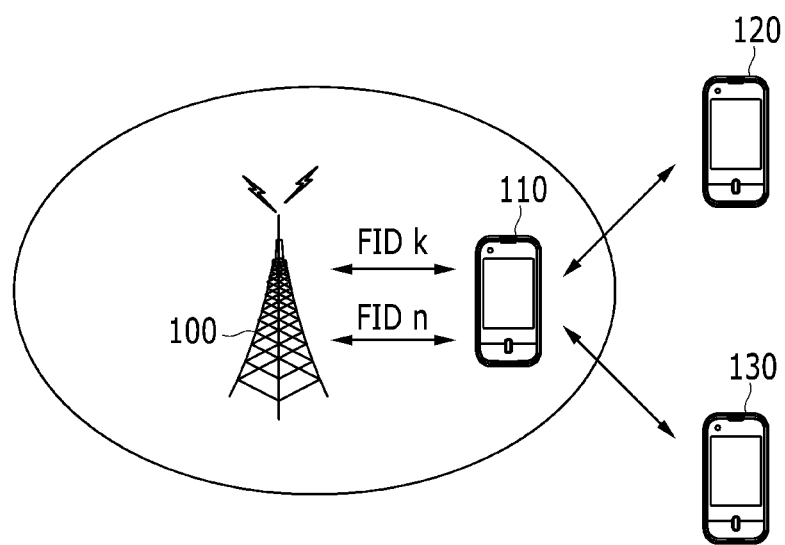
FIG. 2 is a diagram illustrating a procedure in which a forwarding terminal (MS) sets traffic connection according to a first exemplary embodiment of the present invention.

FIG. 2 is a diagram illustrating a procedure in which a forwarding MS sets traffic connection according to a first exemplary embodiment of the present invention.

Referring to FIG. 2, it is assumed that the forwarding MS 110 sets a direct communication link to each of the terminal 120 and the terminal 130. In this case, when a plurality of traffic connections FID (flow identifier) k and FID n are set between the base station 100 and the forwarding MS 110, the forwarding MS 110 connects a direct communication link with the terminal 120 to one traffic connection FID k of traffic connections with the base station 100 and connects a direct communication link with the terminal 130 to the remaining one connection FID n of traffic connections with the base station 100.

A procedure of setting each of traffic connections FID k and FID n may be performed through an exchange procedure of a dynamic service addition request/response/acknowledgement (AAI_DSA_REQ/RSP/ACK) message.

A procedure of connecting a direct communication link between the forwarding MS 110 and the terminal 120 or the terminal 130 may be performed through direct mode link establishment request/response (DM-LEST-REQ/RSP) message exchange.

It is necessary for the base station 100 to know information of a terminal that participates in direct communication. Accordingly, an identifier of a terminal that participates in direct communication should be registered at the base station 100.

Figure 3:
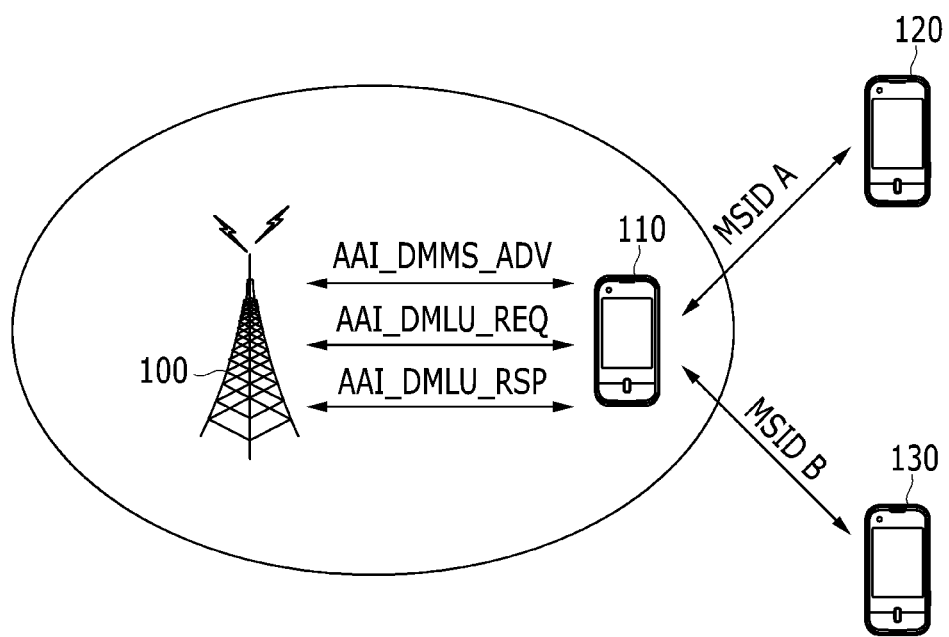
FIG. 3 is a diagram illustrating a procedure of registering an identifier of a terminal that participates in direct communication at a base station according to a first exemplary embodiment of the present invention.

FIG. 3 is a diagram illustrating a procedure of registering an identifier of a terminal that participates in direct communication at a base station according to a first exemplary embodiment of the present invention.

Referring to FIG. 3, the forwarding MS 110 acquires a terminal identifier MSID of the terminals 120 and 130 that participate in direct communication and transmits terminal identifier information to the base station 100, and the base station 100 registers the terminal identifier information. Accordingly, the base station 100 identifies terminals to which a direct communication link is connected.

In this case, it is necessary for the forwarding MS 110 to know a terminal that is not registered at the base station 100. For this purpose, the base station 100 broadcasts an advertisement message (e.g., an AAI-DM-MS-ADV message) including a periodically or non-periodically registered terminal identifier list. The AAI-DM-MS-ADV message may be used mix with the AAI-DC-MM-ADV message, where MM stands for "multimode."

Accordingly, the forwarding MS 110 may know a terminal identifier that is registered at the base station 100. When a terminal identifier that is acquired from another terminal participating in direct communication is not included in a terminal identifier list that is received from a base station, the forwarding MS 110 recognizes the terminal identifier as a new terminal identifier. In this case, the forwarding MS 110 requests an update of a terminal identifier list from the base station 100. That is, the forwarding MS 110 transmits an AAI-DM-LU-REQ message (may be used mix with an AAI-DC-LU-REQ message) that requests update to the base station 100 and receives an AAI-DM-LU-RSP message (may be used mix with an AAI-DC-LU-RSP message), which is a response to an update request from the base station 100, thereby registering a new terminal identifier at the base station 100. In the messages, LU stands for "list update."

Here, only a case of registering a new terminal identifier is exemplified, but as a direct communication link is released, the above processes can be equally applied to a case of deleting an already registered terminal identifier.

It is necessary to define traffic setting of infracommunication and a message that connects a direct communication link.

Table 1 represents a message that is related on a function basis in a one-to-one communication procedure that performs unicast transmission, and Table 2 represents a message that is related on a function basis at a one-to-many communication procedure that performs multicast transmission.

TABLE 1

| Function | Infracommunication | Direct communication link |
| --- | --- | --- |
| Paging | PAG-ADV | DM-PAG-ADV |
| Link establishment | DSA-REQ/RSP/ACK | DM-LEST-REQ/RSP |

TABLE 1-continued

| Function | Infracommunication | Direct communication link |
|---|---|---|
| Flow management | DSx-REQ/RSP/ACK | DM-DSx-REQ/RSP/ACK |
| Link release | DSD-REQ/RSP/ACK | DM-LREL-REQ/RSP |

TABLE 2

| Function | Infracommunication | Direct communication link |
|---|---|---|
| Link establishment | DSA-REQ/RSP/ACK | DM-LEST-CMD |
| Flow management | DSx-REQ/RSP/ACK | DM-DSx-CMD |
| Link release | DSD-REQ/RSP/ACK | DM-LREL-CMD |

As shown in Tables 1 and 2, a procedure (e.g., Direct Mode-Link Establishment-Request/Response (DM-LEST-REQ/RSP), or Direct Mode-Link Establishment-Command (DM-LEST-CMD) corresponding to link establishment in direct communication is related to a flow establishment procedure (e.g., Dynamic Service Addition-Request/Response/Acknowledgement (DSA-REQ/RSP/ACK)) in infracommunication, and a procedure (e.g., Direct Mode-Link Release-Request/Response (DM-LREL-REQ/RSP) or Direct Mode-Link Release-Command (DM-LREL-CMD)) corresponding to link release in direct communication is related to a flow release procedure (e.g., Dynamic Service Deletion-Request/Response/Acknowledgement (DSD-REQ/RSP/ACK) in infracommunication. A flow management procedure (e.g., DM-DSx-REQ/RSP/ACK or DM-DSx-CMD) in direct communication is related to a flow management procedure (e.g., DSx-REQ/RSP/ACK) in infracommunication. Here, the DM-LEST-REQ/RSP message may be used mix with an Advanced Air Interface-Direct (AAI)-Direct Communication (DC)-LEST-REQ/REQ message. The DM-DSx-REQ/RSP/ACK message may be used together with the AAI-DC-DSx-REQ/RSP/ACK message. The DM-LREL-REQ/RSP message may be used mix with the AAI-DC-LREL-REQ/RSP message. The DM-LEST-CMD message may be used together with the AAI-DC-LEST-CMD message. The DM-DSx-CMD message may be used mix with the AAI-DC-DSx-CMD message. The DM-LREL-CMD message may be used mix with the AAI-DC-LREL-CMD message.

Figure 4:
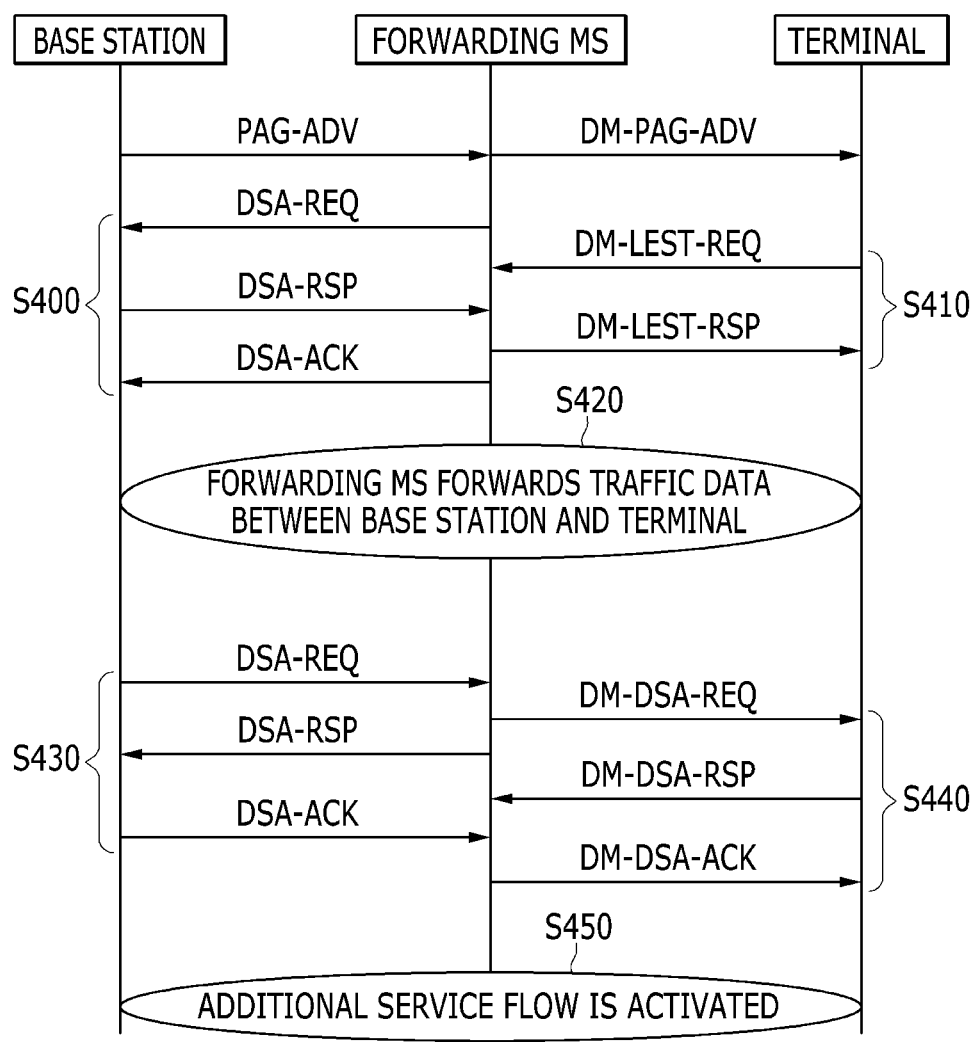
FIGS. 4 and 5 are diagrams illustrating an example of a signal procedure that is related to a link establishment function of direct communication and a traffic connection setting function of infracommunication.
Figure 5:
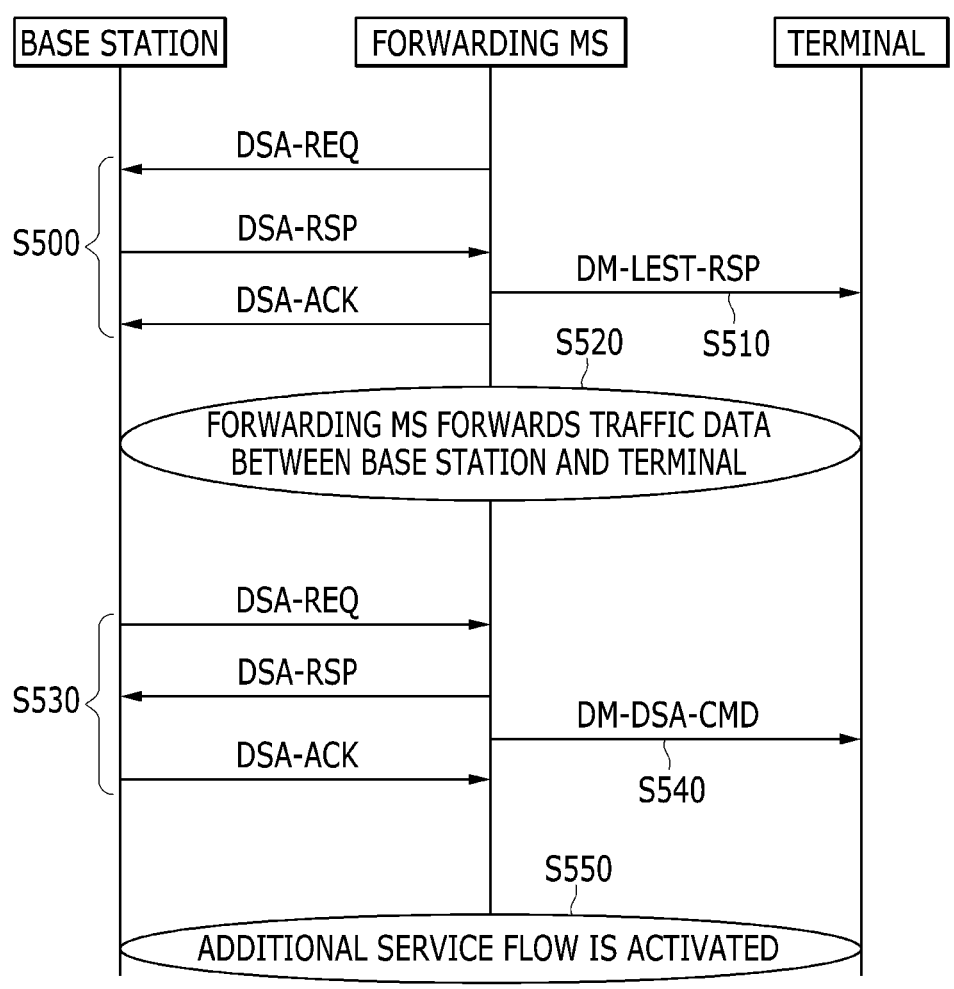

FIGS. 4 and 5 are diagrams illustrating an example of a signal procedure that is related to a link establishment function of direct communication and a traffic connection setting function of infracommunication.

Referring to FIG. 4, in an one-to-one direct communication link, a flow setting function of infracommunication between the base station 100 and the forwarding MS 110 is performed (a DSA-REQ/RSP/ACK message is exchanged) according to an unicast procedure (S400), and a link establishment function of direct communication between the forwarding MS 110 and the terminal 120 is performed (a DM-LEST-REQ/RSP is exchanged) according to a one-to-one procedure (S410).

Thereafter, the forwarding MS 110 mutually forwards data using flow of infracommunication and a link of direct communication (S420).

When it is necessary to add traffic connection (i.e., service flow), a flow setting function of infracommunication between the base station 100 and the forwarding MS 110 is performed (a DSA-REQ/RSP/ACK message is exchanged) according to a unicast procedure (S430), and a flow management function of direct communication between the forwarding MS 110 and the terminal 120 is performed (DM-DSA-REQ/RSP/ACK) according to a one-to-one procedure (S440).

Accordingly, additional service flow between the base station 100 and the forwarding MS 110 and between the forwarding MS 110 and the terminal 120 is activated (S450).

A flow setting procedure may be interlocked with a 3-way handshake method.

Referring to FIG. 5, in a one-to-many direct communication link, a flow setting function of infracommunication between the base station 100 and the forwarding MS 110 is performed (a DSA-REQ/RSP/ACK message is exchanged) according to a unicast procedure (S500), and a link establishment function of direct communication between the forwarding MS 110 and the terminal 120 is performed (a DM-LEST-RSP is transmitted) according to a one-to-many procedure (S510). Thereafter, the forwarding MS 110 mutually forwards data using flow of infracommunication and a direct communication link (S520).

When it is necessary to add service flow, a flow setting function of infracommunication between the base station 100 and the forwarding MS 110 is performed (a DSA-REQ/RSP/ACK message is exchanged) according to a unicast procedure (S530), and a flow management function of direct communication between the forwarding MS 110 and the terminal 120 is performed (DM-DSA-CMD) according to a one-to-one procedure (S540).

Accordingly, additional service flow between the base station 100 and the forwarding MS 110 and between the forwarding MS 110 and the terminal 120 is activated (S550).

In this way, a traffic connection for infracommunication is set between the base station 100 and the forwarding MS 110, and a link for direct communication is set between the forwarding MS 110 and the terminal 120. Accordingly, terminals 110 and 120 that participate in direct communication cannot directly forward data for direct communication to a backbone network, but can forward the data to a backbone network using infracommunication.

Hereinafter, a method of using infracommunication in order to widen a service area that can perform direct communication according to a second exemplary embodiment of the present invention will be described.

Figure 6:
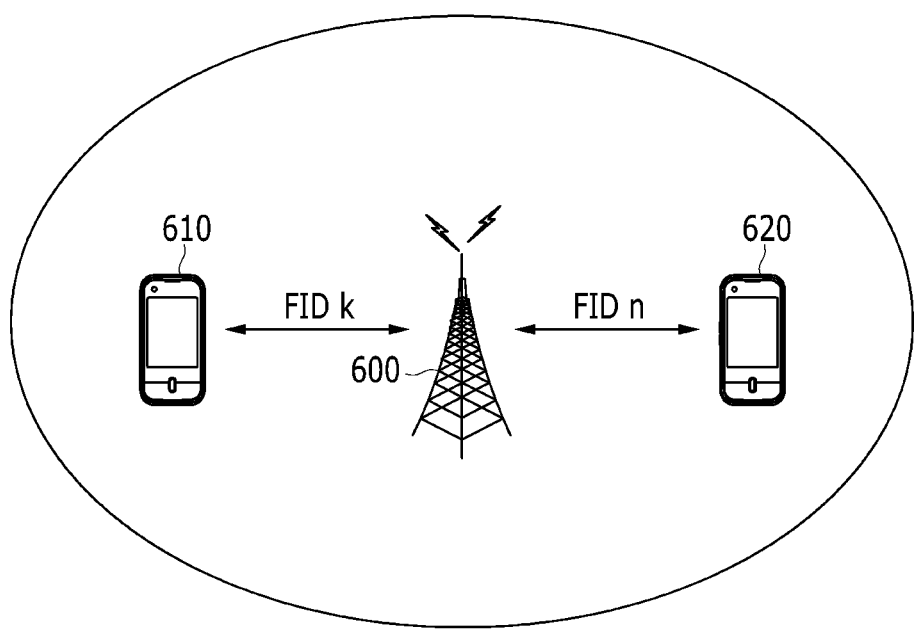
FIG. 6 is a diagram illustrating a communication environment according to a second exemplary embodiment of the present invention.

FIG. 6 is a diagram illustrating a communication environment according to a second exemplary embodiment of the present invention.

Referring to FIG. 6, a communication environment according to a second exemplary embodiment of the present invention includes a base station 600 and at least one of terminals 610 and 620. Here, the terminals 610 and 620 perform direct communication between terminals. In this case, the terminals 610 and 620 are positioned within an area that can perform infracommunication with a base station and may perform infracommunication with the base station 600. The terminals 610 and 620 can independently perform direct communication and infracommunication.

The base station 600 performs a function of connecting traffic between the terminals 610 and 620 instead of transmitting data that it receives from the terminals 610 and 620 to a gateway. For example, when the terminal 610 and the terminal 620 perform direct communication, the terminals 610 and 620 set service flows FID k and FID n, respectively, with the base station 600. The base station 600 transmits traffic through the service flow FID k with the terminal 610 to the service flow FID n with the terminal 620, and transmits traffic through the service flow FID n with the terminal 620 to the service flow FID k with the terminal 610.

Accordingly, the terminal 610 and the terminal 620 perform direct communication through the base station 600. Even when the base station 600 is not connected to a backbone network or even when some functions of the base station 600 are broken by a disaster, a service radius in which direct communication can be performed between terminals can be widened.

For this purpose, it is necessary to define a node and a message.

Figure 7:
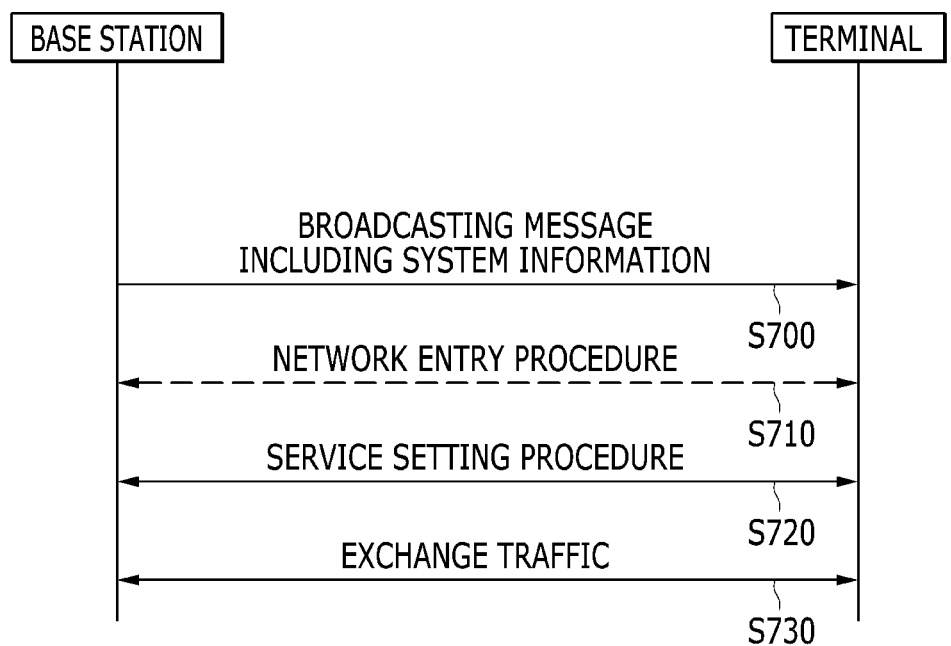
FIG. 7 is a flowchart illustrating a procedure in which a base station supports direct communication between terminals according to a second exemplary embodiment of the present invention.

FIG. 7 is a flowchart illustrating a procedure in which a base station supports direct communication between terminals according to a second exemplary embodiment of the present invention. Here, it is assumed that the base station provides a service to terminals within the base station area without connection to a backbone network.

Referring to FIG. 7, the base station 600 broadcasts a broadcasting message including system information to the terminals 610 and 620 (S700). A broadcasting message (AAI-MM-ADV with Action Type=0b100) including system information may be information representing that the broadcasting message can provide a limited service without connection to a backbone network. The base station 600 that is not connected to a backbone network cannot perform all connection settings in which backbone connection is necessary or traffic transmitting/receiving. Therefore, the terminals 610 and 620, having received the corresponding message from the base station 600, perform a network entry procedure (S710), request setting of a service in which backbone connection is unnecessary (S720), and exchange traffic with the base station 600 (S730).

Figure 8:
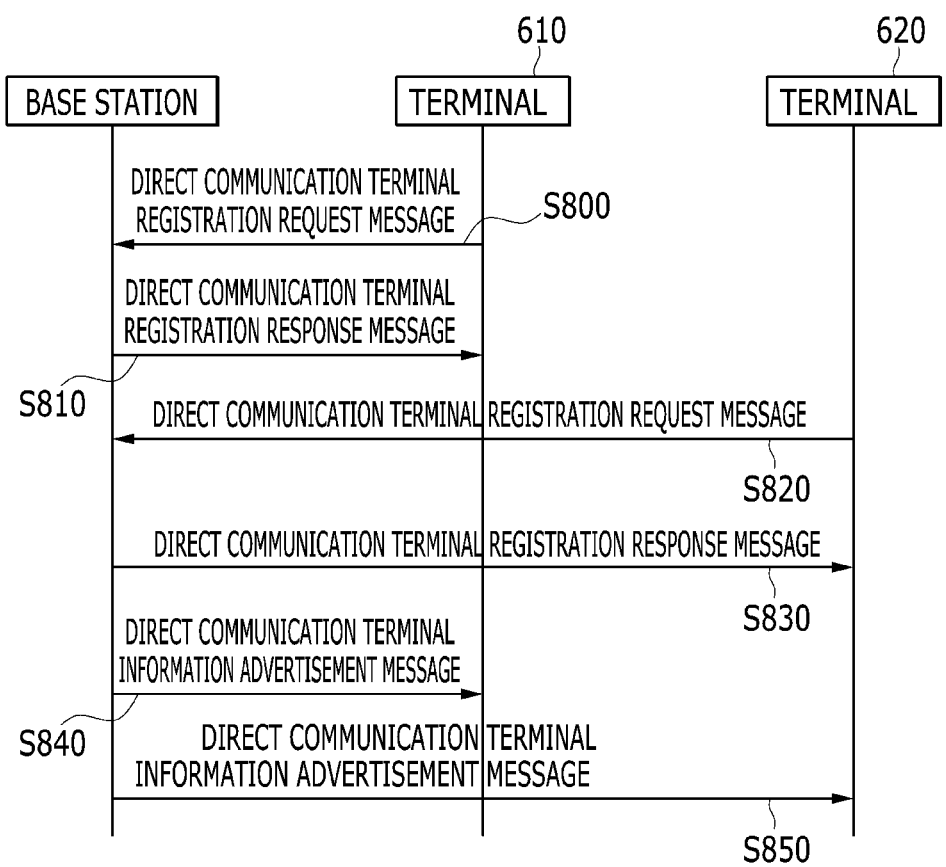
FIG. 8 is a flowchart illustrating a procedure of registering information of direct communication terminals at a base station according to a second exemplary embodiment of the present invention.

FIG. 8 is a flowchart illustrating a procedure of registering information of direct communication terminals to a base station according to a second exemplary embodiment of the present invention.

Referring to FIG. 8, the terminals 610 and 620 having a direct communication interface among terminals that are connected to the base station 600 transmit a direct communication terminal registration request message to the base station 600 (S800 and S820). The direct communication terminal registration request message includes information (e.g., a terminal identifier) of the terminal. If the terminals 610 and 620 are forwarding MSs that provide a forwarding function to other terminals having a direct communication interface, information of other terminals may be included in a direct communication terminal registration request message.

The base station 600, having received the direct communication terminal registration request message, transmits a direct communication terminal registration response message to the terminals 610 and 620 (S810 and S830).

The base station 600 collects information of a terminal in which direct communication is available using a direct communication terminal registration request message that it receives from the terminals 610 and 620. The base station 600 broadcasts the collected terminal information through a direct communication terminal information advertisement message (S840 and S850). The direct communication terminal information advertisement message may be periodically or non-periodically transmitted. The terminal information that is included in the direct communication terminal information advertisement message includes information of a terminal that is connected to the base station through an infracommunication interface and in which direct communication is available. The terminal information may further include information of a terminal that is not connected to an infracommunication interface and that can perform direct communication with a forwarding terminal.

When the base station 600 receives a direct communication terminal registration request message from the terminals 610 and 620, the base station 600 changes information of a terminal that is included in the direct communication terminal information advertisement message according to information that is included in the direct communication terminal registration request message.

Figure 9:
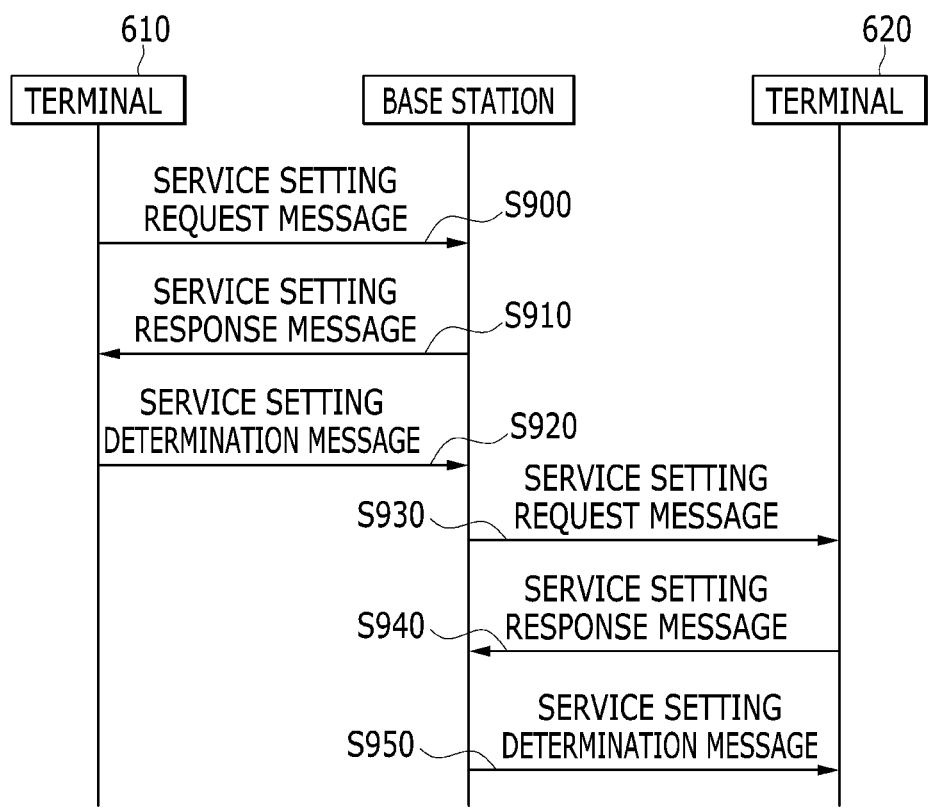
FIGS. 9 and 10 are flowcharts illustrating a service setting procedure according to a second exemplary embodiment of the present invention.
Figure 10:
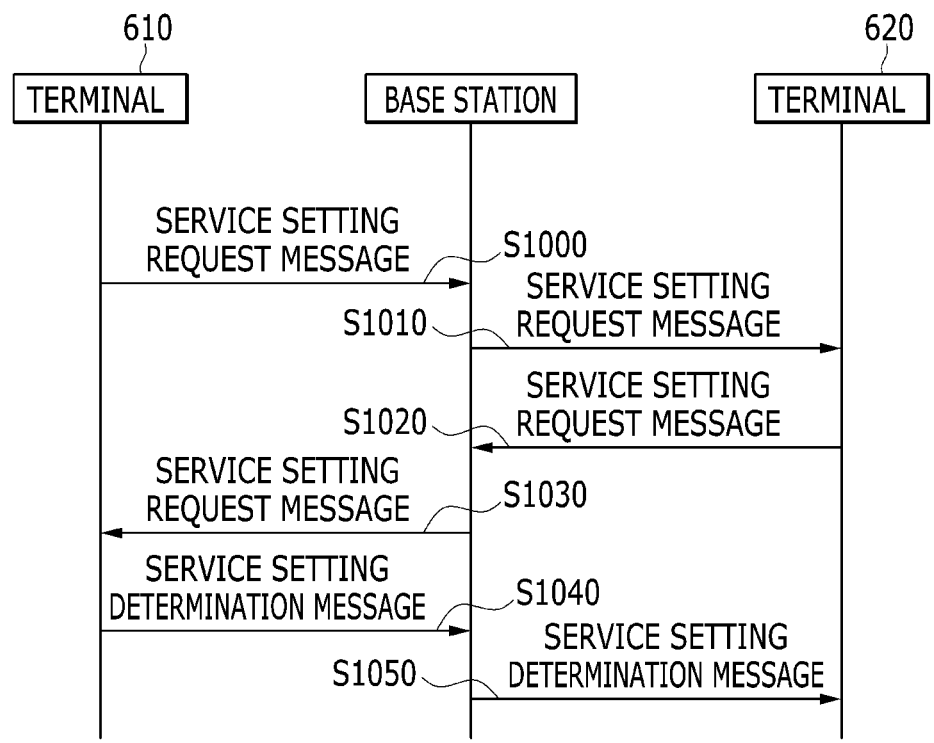

FIGS. 9 and 10 are flowcharts illustrating a service setting procedure according to a second exemplary embodiment of the present invention. FIGS. 9 and 10 illustrate that the base station 600 knows information of another terminal 620 to which the terminal 610 is to directly communicate.

Referring to FIG. 9, the terminal 610 transmits a service setting request message that requests connection setting to the terminal 620 to the base station 600 (S900). The service setting request message may further include an identifier of a source terminal (terminal 610) and an identifier of a destination terminal (terminal 620) for a classification function as well as service flow parameters for general service setting.

The base station 600, having received the service setting request message, transmits a service setting response message to the terminal 610 in response thereto (S910). The service setting response message includes service flow parameters including a processing result of a service setting request message and service flow ID.

The terminal 610, having received the service setting response message, transmits a service setting determination message to the base station 600 in response thereto (S920).

The base station 600 transmits a service setting request message to the terminal 620 using an identifier of a destination terminal that is included in the service setting request message that is transmitted by the terminal 610 (S930). A service setting request message that is transmitted by the base station 600 includes an identifier of a source terminal and an identifier of a destination terminal for a classification function as well as service flow parameters for general service setting.

The terminal 620, having received the service setting request message, transmits a service setting response message to the base station 600 (S940), and the base station 600 responds as a service setting determination message to the service setting request message (S950).

Referring to FIG. 10, the terminal 610 transmits a service setting request message that requests connection setting to the terminal 620, to the base station 600 (S1000). The service setting request message may further include an identifier of a source terminal (the terminal 610) and an identifier of a destination terminal (the terminal 620) for a classification function as well as service flow parameters for general service setting.

The base station 600 transmits a service setting request message to the terminal 620 using an identifier of a destination terminal that is included in the service setting request message that is transmitted by the terminal 610 (S1010). The service setting request message that is transmitted by the base station 600 includes an identifier of a source terminal and an identifier of a destination terminal for a classification function as well as service flow parameters for general service setting.

The terminal 620, having received the service setting request message, transmits a service setting response message to the base station 600 in response thereto (S1020). The base station 600 transmits a service setting response message to the terminal 610 (S1030). The service setting response message includes service flow parameters including a processing result of the service setting request message and service flow ID.

The terminal 610, having received the service setting response message, transmits a service setting determination message to the base station 600 in response thereto (S1040). The base station 600 transmits a service setting determination message to the terminal 620 (S1050).

In FIGS. 9 and 10, when a CS specification parameter is set to IPv4/IPv6 or IEEE802.3, an IPv4/IPv6 or IEEE802.3 address of the source terminal is set as an identifier of a source terminal and an identifier of a destination terminal that are defined in the service setting request message. However, for a direct communication service that does not use a corresponding address as an identifier, it is necessary to define a new CS specification parameter. Table 3 represents a service setting request message (AAI-DSA-REQ) message according to an exemplary embodiment of the present invention.

TABLE 3

| Field | Size (bits) | Value/Description | Condition |
|---|---|---|---|
| ... | ... | ... | ... |
| CS Specification parameter | 8 | 0: Reserved<br>1: Packet, IPv4<br>2: Packet, IPv6<br>3: Packet, IEEE 802.3/Etherneta<br>4: Reserved<br>5: Reserved<br>6: Reserved<br>7: Reserved<br>8: Reserved<br>9: Reserved<br>10: Reserved<br>11: Reserved<br>12: Reserved<br>13: Reserved<br>14: Packet, IPb<br>15: Multiprotocol flow<br>16-17: Reserved<br>18: Talk-around DC<br>19-255: Reserved<br>(a: Classifiers for IEEE 802.1Q VLAN tags may be applied to service flows of this CS type)<br>(b: SDUs for service flows of this CS type may carry either IPv4 or IPv6 in the payload) | Present if needed |
| ... | ... | ... | ... |
| inner IPv6 Flow | 8 | Label IPv6 Flow Label of inner IP header | Present if needed |
| Source DCTID | 24 | Indicates a source HR-MS addresses for talk-around DC | Present if needed |
| Target DCTID or DCGID | 24 | Indicates a target HR-MS or Group addresses for talk-around DC | Present if needed |
| } //End If (Packet Classification Rule) | | | |
| ... | ... | ... | ... |
| } | | | |

In Table 3, a new CS specification parameter (talk-around DC) for direct communication is defined. That is, an identifier of a source terminal for direct communication or an identifier of a destination terminal may be newly defined to a service setting request message. For example, in unicast, Direct Communication Terminal Identification (DCTID) may be defined, and in broadcast/multicast, Direct Communication Group Identification (DCGID) may be defined.

In FIGS. 9 and 10, only a service setting procedure is illustrated, but the above processes can be equally applied to a service change procedure and a service release procedure.

Figure 11:
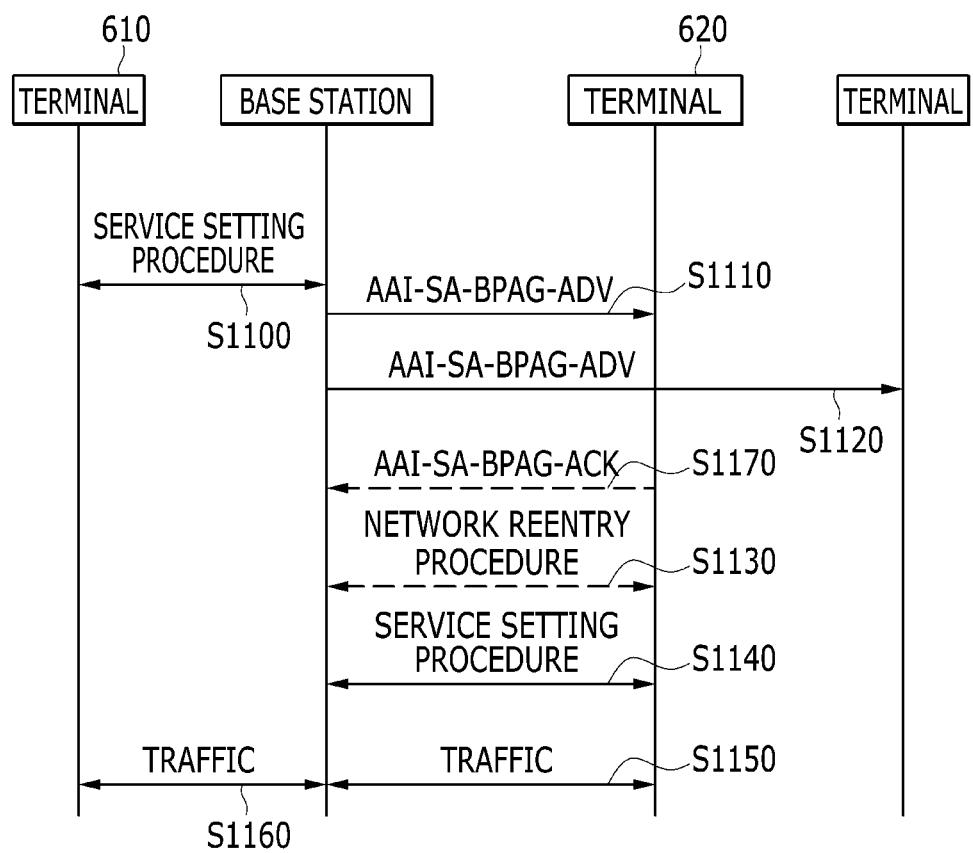
FIG. 11 is a flowchart illustrating a service setting procedure according to a second exemplary embodiment of the present invention.

FIG. 11 is a flowchart illustrating a service setting procedure according to a second exemplary embodiment of the present invention. FIG. 11 illustrates a case where the base station 600 does not know information of another terminal 620 to which the terminal 610 is to directly communicate. For example, when a procedure that is illustrated in FIG. 8 is not successfully performed or when a terminal is in an idle mode, the base station may not know information of the terminal.

Referring to FIG. 11, a service setting procedure between the terminal 610 and the base station 600 is performed (S1100). The service setting procedure may be performed like a procedure (steps S900 to S920) that is illustrated in FIG. 9.

Because the base station 600 does not know information of another terminal 620 to which the terminal 610 is to directly communicate, in order to induce a service setting procedure of the terminal 620, the base station 600 broadcasts a direct communication service advertisement message (AAI-SA (Standalone)-BPAG (blind paging)-ADV (advertisement)) (S1110 and S1120). All terminals may receive the AAI-SA-BPAG-ADV message regardless of a terminal state (e.g., an idle mode or an active mode). Table 4 is an example of an AAI-SA-BPAG-ADV message according to an exemplary embodiment of the present invention.

TABLE 4

| Field | Size (bits) | Value/Description | Condition |
|---|---|---|---|
| For (i=0; i<Num BPAG: i++) { | | Num BPAG indicates the number of blind paging items | |
| DCTID | 24 | Indicates a target HR-MS address for talk-around direct communication | |
| Action code | 1 | Used to indicate the purpose of the AAI-SA-BPAG-ADV message<br>0b0: send AAI-SA-BPAG-ACK message if active or perform network reentry if idle<br>0b1: reserved | |
| } | | | |

Referring to Table 4, the AAI-SA-BPAG-ADV message may include identifier information of the terminal 620, which is a service setting request target.

System information (e.g., a blind paging cycle, a message offset) necessary for receiving the AAI-SA-BPAG-ADV message may be periodically broadcasted through a system information transmission message (AAI-system configuration descriptor). Table 5 is an example of a system information transmission message according to an exemplary embodiment of the present invention.

TABLE 5

| Field | Size (bits) | Value/Description | Condition |
|---|---|---|---|
| Multicast Group Zone ID | 12 | Indicates a Multicast Group Zone ID provided by this BS<br>Shall not be set to "0." | In HR-Network |
| Multicast Indication cycle | 8 | Start of multicast indication cycle<br>The first superframe is the multicast available interval and remaining superframes are the multicast unavailable intervals<br>8 LSB of superframe number | Shall be present unless Multicast Group Zone is set to "0" in HR-Network |
| HR Multimode indication | 2 | Indicates whether current BR/RS is HR-MS acting as BS/RS or HR-BS acting as RS<br>0b00: current BS/RS is neither HR-MS acting as BS/RS nor HR-BS acting as RS<br>00b01: current BS/RS is HR-MS acting as BS/RS<br>0b10: current BS/RS is HR-BS acting as RS<br>0b11: reserved | HR Multimode indication Shall be present in HR-Networks |
| Blind Paging Offset | 12 | Indicates the number of TDC frames used for blind paging offset | Present if need in HR-Networks |
| Blind Paging Cycle | 4 | Indicates the number of TDC frames with that a blind paging listening interval repeats | Present if need in HR-Networks |

Referring to Table 5, the terminal may acquire information about a blind paging cycle from a system information transmission message and information about blind paging offset. The terminal may induce the start of a blind paging interval based on information about a blind paging cycle and information about blind paging offset. For example, an interval that receives an AAI-SA-BPAG-ADV message may start from a superframe satisfying Nsuperframe modulo Blind Paging Cycle=Blind Paging Offset.

When only an identifier of the terminal 620 is included in the AAI-SA-BPAG-ADV message, if an identifier of the terminal 620, having received the AAI-SA-BPAG-ADV message, corresponds with the identifier that is included in the AAI-SA-BPAG-ADV message, when the terminal 620 is in an idle mode, a network reentry procedure is performed (S1130). In this case, when a ranging procedure is performed, network reentry in an idle mode by direct communication may be written as a ranging purpose in a ranging request message. Table 6 illustrates a ranging request message (AAI_RNG_REQ) according to an exemplary embodiment of the present invention.

TABLE 4

| Field | Size (bits) | Value/Description | Condition |
|---|---|---|---|
| Ranging Purpose Indication | 4 | 0b0000 = Initial network entry<br>0b0001 = HO reentry<br>0b0010 = Network reentry from idle mode<br>0b0011 = Idle mode location update<br>0b0100 = DCR mode extension<br>0b0101 = Emergency call setup (e.g., E911)<br>0b0110 = Location update for updating service flow management encodings of E-MBS flows<br>0b0111 = Location update for transition to DCR mode from idle mode<br>0b1000 = Reentry from DCR mode, coverage loss or detection of different ABS restart count<br>0b1001 = Network reentry from a Legacy BS<br>0b1010 = Zone switch to MZONE from LZONE<br>0b1011 = Location update due to power down<br>0b1100 = Interference mitigation request to a CSG Femto ABS when experiencing interference from the CSG Femto ABS<br>0b1101 = NS/EP call setup<br>0b1110 = HR multicast service flow update<br>0b1111= Extended Ranging Purpose | — |
| Extended Ranging Purpose Indication | 4 | 0b0000 = Network reentry from idle mode for extension of TDC<br>0b0001-0b1111= reserved | |
| ... | | ... ... | ... |

The base station 600 and the terminal 620 perform a service setting procedure (S1140). The service setting procedure may be performed like a procedure (steps S930 to S950) that is illustrated in FIG. 9. Thereafter, a traffic exchange procedure is performed between the base station 600 and the terminal 610 and between the base station 600 and the terminal 620 (S1150 and S1160).

However, when the terminal 620 is in an active mode, the terminal 620 omits a network reentry procedure, and by transmitting the AAI-SA-BPAG-ACK message to the base station 600, the terminal 620 may notify the base station 600 that connection setting is available (S1170). The AAI-SA-BPAG-ACK message may include an identifier DCTID and an MAC address of the terminal 620. Table 7 represents an AAI-SA-BPAG-ACK message according to an exemplary embodiment of the present invention.

TABLE 7

| Field | Size (bits) | Value/Description | Condition |
|---|---|---|---|
| Target DCTID | 24 | Indicates a target HR-MS address for talk-around direct communication | |
| Target MAC address | 24 | Indicates a target HR-MS MAC address for infrastructure communication | |

When identifier information of the terminal 620, which is a service setting request target and the terminal 620 and identifier information of the terminal 610 to communicate with the terminal 620, is included in the AAI-SA-BPAG-ACK message, the terminal 620 may perform a terminal-initiated service setting procedure. For example, when the terminal 620 is in an idle mode, after performing a network entry procedure, the terminal 620 may perform a terminal-initiated service setting procedure. When the terminal 620 is in an active mode, the terminal 620 may perform a terminal-initiated service setting procedure without performing a network entry procedure.

Table 8 defines a MAC control message that is used for a method according to an exemplary embodiment of the present invention.

TABLE 8

| No. | Functional Areas | Message Names | Message Description | Security | Connection |
|---|---|---|---|---|---|
| TBD | Multicast | AAI-MG-IND | Multicast Group Indication Message | | Broadcast |
| TBD | Multicast | AAI-MT-IND | Multicast Traffic Indication Message | | Broadcast or Multicast |
| TBD | Standalone | AAI-SA-BPAG-ADV | Blind Page Advertisement Message | | Broadcast |
| TBD | Standalone | AAI-SA-BPAG-ACK | Blind Page ACK message | | Unicast |

Figure 12:
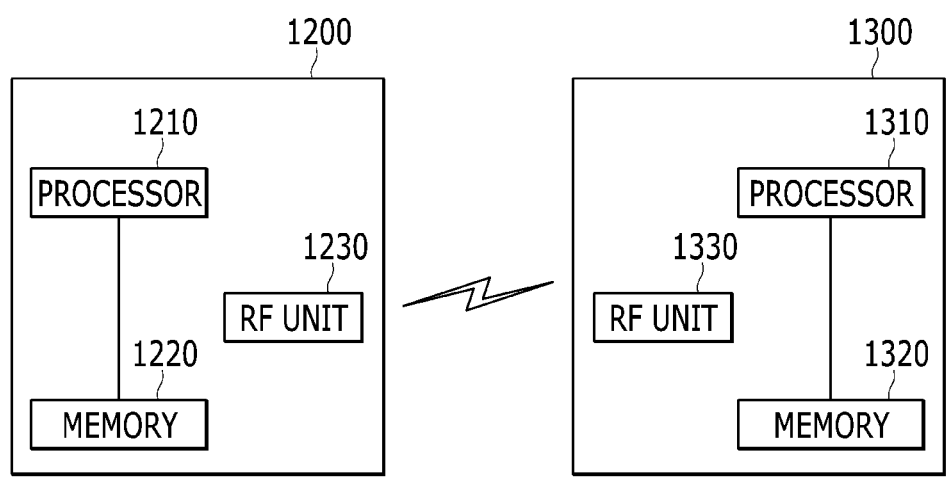
FIG. 12 illustrates a terminal and a base station that can be applied to an exemplary embodiment of the present invention.

FIG. 12 illustrates a terminal and a base station that can be applied to an exemplary embodiment of the present invention.

Referring to FIG. 12, the mobile communication system includes a terminal 1200 and a base station 1300. The terminal 1200 and the base station 1300 include processors 1210 and 1310, memories 1220 and 1320, and radio frequency (RF) units 1230 and 1330, respectively. The processors 1210 and 1310 may be formed to embody a procedure and/or methods that are suggested in the present invention. The memories 1220 and 1320 are connected to the processors 1210 and 1310, and store various information that are related to operation of the processors 1210 and 1310. The RF units 1230 and 1330 are connected to the processors 1210 and 1310 and transmit and/or receive a wireless signal. The base station 1300 and/or the terminal 1200 may have a single antenna or multiple antennas.

According to an exemplary embodiment of the present invention, at least one of terminals participating in direct communication between terminals can exchange information with a backbone network through a base station. When performing direct communication between terminals, by using infracommunication, a service area in which direct communication is available can be widened.

An exemplary embodiment of the present invention may not only be embodied through an apparatus and method, but may also be embodied through a program that executes a function corresponding to a configuration of the exemplary embodiment of the present invention or through a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method of a first terminal for establishing direct communication between the first terminal and a second terminal through a base station, the method comprising:

receiving broadcasted system information from the base station that has received, from the second terminal, a request to establish the direct communication and identifiers of the first and second terminals, and has broadcasted the system information to all terminals, the broadcasted system information including a blind paging cycle and a blind paging offset;

calculating a time interval, during which the first terminal is to receive an advertisement message from the base station, using the received blind paging cycle and blind paging offset;

receiving the advertisement message from the base station during the calculated time interval, the advertisement message including the identifier of the first terminal; and performing, upon detecting the identifier of the first terminal in the received advertisement message, a service setting procedure with the base station, to thereby enable the direct communication between the first and second terminals through the base station.

2. The method of claim 1, wherein the advertisement message further includes an action code
that instructs to perform a network re-entry procedure when the first terminal is in an idle mode, and
that instructs to transmit a response to the advertisement message to the base station when the first terminal is in an active mode.

3. The method of claim 1, further comprising transmitting a ranging request message to the base station when the first terminal is in an idle mode, the ranging request message including a ranging purpose.

4. The method of claim 1, further comprising transmitting a response message to the advertisement message to the base station when the first terminal is in an active mode,
wherein the response message comprises the identifier and a medium access control (MAC) address of the first terminal.

5. The method of claim 1, wherein the calculating a time interval includes calculating the time interval using N mod BPC=BPO, where
N is a number of a superframe at which the time interval starts,
BPC is the received blind paging cycle,
BPO is the received blind paging offset, and
mod is a modulo operation.

* * * * *